United States Patent [19]
Colegrove

[11] 3,894,880

[45] July 15, 1975

[54] PROCESS OF SUSPENDING SOLUBLE ALGINATES AND COMPOSITIONS SO PRODUCED

[75] Inventor: George T. Colegrove, San Diego, Calif.

[73] Assignee: Kelco Company, San Diego, Calif.

[22] Filed: Nov. 4, 1974

[21] Appl. No.: 520,335

[52] U.S. Cl. ............................. 106/208; 252/316
[51] Int. Cl. ................... C08b 25/00; C08b 27/42
[58] Field of Search ............ 106/189, 208; 117/156; 252/8.5, 316

[56] References Cited
UNITED STATES PATENTS

| | | | |
|---|---|---|---|
| 3,428,464 | 2/1969 | Pollard | 106/38.35 |
| 3,557,016 | 1/1971 | Schuppner | 252/316 |
| 3,625,889 | 12/1971 | Branscum | 252/8.5 A |
| 3,692,552 | 9/1972 | Ruggeberg | 106/208 |
| 3,734,801 | 5/1973 | Sebel | 117/156 |
| 3,765,918 | 10/1973 | Jordan et al. | 106/208 |
| 3,821,008 | 6/1974 | Jordan et al. | 106/38.23 |

*Primary Examiner*—Theodore Morris
*Attorney, Agent, or Firm*—Hesna J. Pfeiffer; J. Jerome Behan

[57] ABSTRACT

Water soluble alginates can be prepared as highly concentrated pumpable suspensions in alcohol-water carriers using xanthan gum as a suspending agent. The amount of xanthan gum in the total composition is between 0.3 and 1.0%, which can be used to suspend between 20 and 40% alginate.

9 Claims, No Drawings

PROCESS OF SUSPENDING SOLUBLE ALGINATES AND COMPOSITIONS SO PRODUCED

This invention relates to a process and a composition for preparing a suspension of a water soluble alginate. The slurry produced can be used for metered or automatic addition of the alginate to industrial systems. Previously, the alginates have been added as dry powders, necessitating a manual operation.

Water soluble alginates are widely available and used in many industries. For instance, in small percentages they are found in dressings and dye pastes in the textile industry; as suspending agents in liquid pharmaceuticals; as suspending agents in paints, cosmetics, insecticides, car polishes, etc. Alginates are also useful in the preparation of ice cream, as stabilizers and in preventing crystal growth in the final product. Many of these industrial applications of alginates utilize automatic or semi-automatic formulation of the product, whereby the various ingredients are added from storage vessels by timed-metering devices.

Heretofore, the water soluble alginates have been added manually, even with automated industrial plants, as the dry powder could not be controlled sufficiently well for automatic addition. Also, the dry powder could not be mixed with a common solvent such as water as it is quite soluble and form a viscous solution, especially in high concentrations, which is difficult to pump and does not flow readily.

It is therefore an object of this invention to provide a pumpable suspension of a soluble alginate which can be easily used in a automated industrial plant. It is a further object of this invention to provide a process for preparing a pumpable alginate suspension. Another object is to provide an alginate suspension which does not contain any substances which interfere in the alginate application.

The water soluble alginates, which can be used in the process and composition of this invention, are commercially available as salts of alginic acid. These products are available in varying molecular weights as the final product viscosity is a function of the alginic acid molecular weight. The process of this invention is applicable to all water soluble alginates whether high or low viscosity.

The water soluble alginates which are available commercially are generally salts formed from monovalent alkali metal or alkaline earth metal cations, or low molecular weight amines. For example, sodium alginate, potassium alginate, ammonium alginate, or magnesium alginate, are useful in this invention. The only limitation placed on the alginate for the use of this invention is that it must be soluble in water. The process of this invention is otherwise independent of any properties of the alginate.

It has been found that xanthan gum in low concentrations will suspend soluble alginates in a water-alcohol mixture. By the term "alcohol" is meant any of the lower alkanols; for instance, having one to five carbon atoms. The readily available, inexpensive alcohols are preferred, particularly isopropanol, methanol, or ethanol.

The percentage of alcohol in the mixture can be between about 15 and 35% and is preferably between 20 and 25%. This percentage is based on the total solvent blend, water being present to make 100%.

The xanthan gum, which is used as a suspending agent, is also available commercially. It is a hydrophilic colloid produced by bacterium of the species *Xanthomonas campestris*. The colloid is a polymer containing mannose, glucose, glucuronic acid salts such as potassium glucuronate, sodium glucuronate, or the like, and acetyl radicals. Other Xanthomonas bacteria have been found which produce the hydrophilic gum and I have found that any of the xanthan gums can be used in this invention.

The amount of xanthan gum employed is between 0.3 and 1.0% (weight per volume) and preferably between about 0.4 and 0.8%.

The amount of alginate which can be suspended in this system can be between about 20 and 40% (weight per volume).

The pumpable suspensions of this invention are prepared by adding xanthan gum to the alcohol-water solvent blend followed by addition of the alginate, both additions accompanied by sufficient agitation to form a homogenous suspension. However, the order of addition of xanthan gum and the alginate is not critical and it has been found that the alginate can be added first with stirring, and then followed by addition of xanthan gum. It is preferable to add the xanthan gum first as the final suspension is prepared quickly and easily with good reproducable results.

The final viscosity of the pumpable suspension is between 1,000 and 75,000 centipoise at 25°C ± 5°C. Viscosity can be determined using commercially available equipment, such as a Brookfield viscometer. This range of viscosity is pumpable and can be metered into any system.

This invention is further illustrated by the following examples:

EXAMPLE 1

The indicated amounts of isopropanol and water were formulated as solvent blends. The amount of xanthan gum indicated was then added. The xanthan gum used was a food grade xanthan gum, e.g., available under the trade name KELTROL. The amount of alginate identified below was then added. The final viscosity was obtained with the Brookfield HAT with the Heliopath attachment using spindle TC at 5 r.p.m. The results are summarized in Table 1.

TABLE 1

| Percent Xanthan Gum | Alginate | Percent Isopropanol | Viscosity |
|---|---|---|---|
| 0.6 | 18.0% sodium | 35.0 | Soft gel |
| 0.5 | 30.0% sodium | 28.5 | 64,000 cps |
| 0.5 | 20.0% sodium | 25.0 | 14,000 cps |
| 0.5 | 20.0% sodium | 25.0 | 30,000 cps |
| 0.5 | 20.0% ammonium | 25.0 | 20,000 cps |
| 0.5 | 20.0% sodium | 15.0 | 40,000 cps |
| 0.5 | 20.0% sodium | 12.0 | paste |

The first and last blends listed above in Table 1 had viscosity values too high to be determined using the equipment mentioned, both probably substantially higher than 100,000. Each of these two blends would be too viscous to pump easily through antomated equipment.

EXAMPLE 2

Additional formulation work was done to illustrate the percentage of xanthan gum necessary to form a stable suspension. The indicated amount of xanthan gum was used to form a suspension of 20% sodium alginate in a 25% isopropanol-water solvent system. The viscosity was determined of the original suspension and was observed over a period up to three months. The results are summarized in Table 2.

TABLE 2

| Percent Xanthan Gum | Suspension Viscosity | Comments |
|---|---|---|
| 0.1 | 410 cps | Rapid settling |
| 0.2 | 800 cps | Rapid settling |
| 0.3 | 1360 cps | Slow settling |
| 0.4 | 1840 cps | No separation after 3 months |

EXAMPLE 3

Following the same procedures given above, the soluble alginate suspensions were prepared using various alcohols within the operative concentration range. Results are summarized in Table 3.

TABLE 3

| Percent Xanthan Gum | Alginate | Percent Alcohol | Viscosity |
|---|---|---|---|
| 0.5 | 20% sodium | 31.2% isopropanol | 25,000 cps |
| 0.5 | 20% sodium | 28.5% methanol | 15,000 cps |
| 0.5 | 30% sodium | 28.5% ethanol | 64,000 cps |
| 0.5 | 20% sodium | 32.0% isopropanol | 22,000 cps |

Having described the invention, what is claimed is:

1. The process of preparing a pumpable suspension of a water soluble alginate which comprises mixing about 20 to 40% of said alginate and about 0.3 to 1.0% xanthan gum in an alcohol-water solvent system containing 15 to 35% alcohol.

2. The process of claim 1 in which the alginate is added to a previously prepared blend of xanthan in the water-alcohol solvent system.

3. The process of claim 1 wherein the alcohol is a lower alkanol having one to four carbon atoms.

4. The process of claim 1 wherein the water soluble alginate is the sodium, potassium, magnesium, or ammonium salt of alginate acid.

5. A pumpable suspension of a water soluble alginate salt comprising a solvent system of alcohol-water, wherein the alcohol content of the solvent system is from about 15 to 35%;
said solvent system containing from about 0.3 to 1.0% by weight of xanthan gum;
and between about 20 to 40% of said alginate.

6. The composition of claim 5 wherein the alcohol is a lower alkanol having one to four carbon atoms.

7. The process of claim 6 wherein the alcohol is methanol, ethanol, or isopropanol.

8. The composition of claim 5 in which the xanthan gum concentration is 0.4 to 0.8%.

9. The composition of claim 5 wherein the alginate is the sodium, potassium, magnesium, or ammonium salt of alginic acid.

* * * * *